United States Patent Office 3,021,570
Patented Feb. 20, 1962

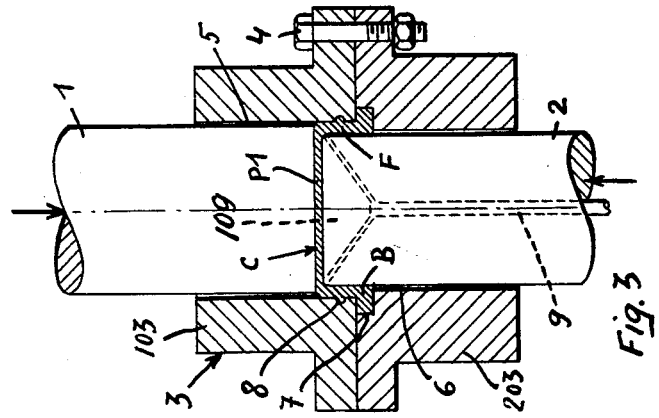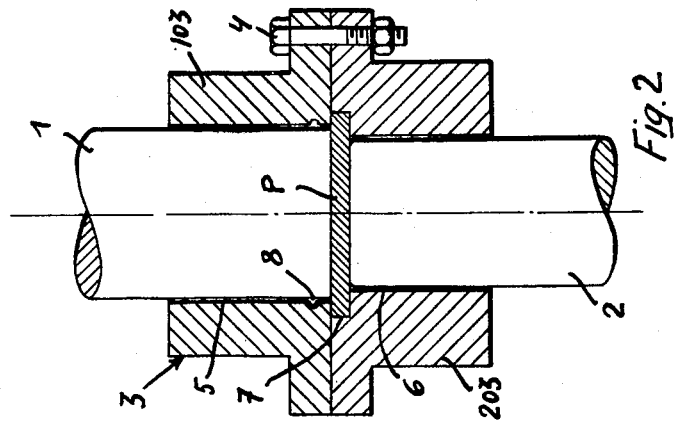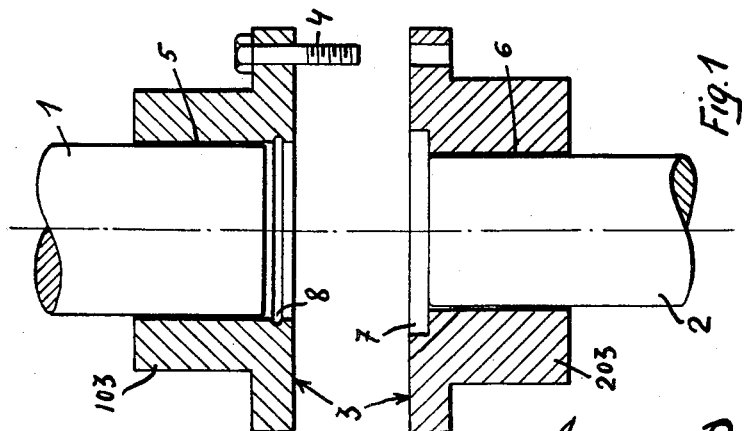

3,021,570
PROCESS FOR THE MANUFACTURE OF HOLLOW ARTICLES FROM THERMOPLASTIC RESIN BLANKS BY COLD EXTRUSION
Armando Podesta, 4 Via Petrarca, and Carlo Vignati, 3 Piazza Sicilia, both of Milan, Italy
Filed Sept. 17, 1957, Ser. No. 684,526
Claims priority, application Italy Sept. 19, 1956
2 Claims. (Cl. 18—56)

This invention relates to the manufacture of hollow articles of thermoplastic resins by a cold extrusion process.

The main object of the invention is to provide simple means for the mass production of hollow articles of synthetic resins, such as polyvinyl or polyethylene resins, by a cold extrusion process, the hollow articles thus produced having charatceristics of compactness and precision of form which are far superior to those of like articles manufactured by a hot molding process. Among the hollow articles which may be easily manufactured by the cold extrusion process according to the invention there may be mentioned: closure caps, bowls, cup-like articles and even tubular articles.

The process according to the invention consists substantially in squeezing a resin blank—usually in disc form—between two co-axial opposite plungers of different diameters slidably mounted in a cylindrical die unit comprising two co-axial cylindrical bores of different diameters which correspond to the diameters of the plungers, whereby when a synthetic resin blank is inserted between the said plungers and is squeezed therebetween, at least a part of it is extruded and flows radially outwardly, while, at the same time, the smaller plunger advances in the larger bore in such a measure as to form an annular chamber of steadily increasing length adapted to take up the extruded material which thus assumes a skirt form which fills up the space between the smaller plunger and the section of the larger cylindrical bore surrounding it.

According to the invention, the sliding of the dies with respect to the plungers may be promoted, at least in part, by the same extruded material which pushes the die unit by acting upon the annular step formed at the end of the smaller-bore die section.

In order to avoid irregular flowing of the extruded material, flowing-braking means such as grooves, riflings, ribs, projections and the like may be provided on either or both surfaces along which the extruded material flows. Furthermore, in order to promote an easy slipping of the extruded material, said material, or the plunger and/or die surfaces or both may be lubricated by a suitable liquid such as oil, or an aqueous oil emulsion, soap water or even, for some resins having a marked water-repellent character, simply water.

The invention will be better understood by the following specification, made with reference to the attached drawing, in which:

FIGURE 1 shows diagrammatically in longitudinal section a device for performing the process according to the invention in open position, viz. ready to take up a blank to be extruded.

FIG. 2 shows the same device in closed position, with a blank inserted between the two pungers, before the beginning of the squeezing operation; and FIGURE 3 shows the position of the parts of the same device by the end of the extrusion process.

The cold extrusion process according to the invention may be readily understood when explained with reference to the device which is diagrammatically shown in the drawing.

In the embodiment as shown this device comprises two oppositely lying co-axial plungers, viz. a large plunger 1 or "reaction plunger" and a smaller-diameter plunger 2 or "action plunger."

The plungers 1 and 2 are slidably mounted in corresponding bores, 5, 6 of a die 3 which, in the example as shown comprises a section 103 having a large bore 5 and a section 203 having a smaller bore 6 which is provided at its end towards the bore 5 with a shallow counter-bore 7 whose diameter is even larger than that of the large bore 5. This counter-bore 7 forms a recess at the inner end of the die section 203 in which a blank or disc P of the material to be extruded may be inserted and may be clamped with its edge between the bottom of said counter-bore 7 and the corresponding bottom edge of the other die section 103, as clearly shown in FIGURE 2. The die sections 103—203 are provided with conventional means for holding same firmly together during the extrusion process and for permitting of same coming apart upon completion of an extrusion process. Said holding means, which in practice are of a conventional self-closing and quick-opening type, are not shown as they do not form part of the invention and, instead, as fastening means is shown a conventional bolt-and-nut fastener 4.

The operation of the device thus described is substantially as follows: The fastener 4 being in loosened position, the two die sections 103—203 are shifted apart together with their plungers 1 and 2 in retracted position, viz. as shown in FIG. 1, the reaction plunger 1 lying with its end somewhat inside of the end of bore 5, while the end of the action plunger 2 lies substantially flush with the step formed at the inner end of the counter-bore 7. In this position a blank P (FIG. 2) is inserted in said shallow recess formed by the said counter-bore 7 and the die sections 103–203, together with their plungers are drawn together and fastened as diagrammatically shown in FIG. 2. In this position, the blank P comes to be clamped at its edge between the said step of the counter-bore 7 of die section 203 and the bottom end of the die section 103, in a kind of annular groove.

The next step is the extrusion step proper, and is diagrammatically shown in FIGURE 3. The action plunger 2 is positively pressed towards the plunger 1 into the large cylinder 5 thus squeezing the blank therebetween. The edge B of the blank being clamped as described, in the shallow recess 7, the squeezed material in the centre portion P1 of the blank flows radially into the annular space between the end of plunger 2 and the corresponding end of cylinder 5 and forms the skirt F of a cap C or a like hollow article which is provided at its outer end with an outturned edge or bead B. During this operative stroke of the plunger 2 the material which forms skirt of the cap, which flows in opposite direction with respect to the action stroke of said plunger 2, presses in the same direction the whole die 3 by acting through edge B against the bottom of the recess 7 and thus an annular chamber of steadily increasing length comes to be formed between bore 5 and plunger 2, which comes to be completely filled with the extruded material forming said skirt F.

The finished cap is taken out by opening the die 3 and bringing the plungers 1, 2 apart, in the position as shown in FIGURE 1. This may be obtained by shifting the die section 103 and reaction plunger 1 in any suitable manner.

The finished cap C may be easily ejected by providing in the small plunger 2 an ejector 109 which may be controlled by means of a stem 9 slidably mounted co-axially of said plunger 2, as diagrammatically shown in FIGURE 3.

During the above-outlined cold extrusion process, between the material and the parts of the plunger 2 and cylinder 5 in contact therewith a film of a suitable lubricant is interposed, such oil, an emulsion of water and oil, soap water and even simple water. This may be effected by any suitable conventional method and device.

In order to obtain very uniform products, it is desirable to provide small concentrical obstacles to the free flow of the material being extruded. An example of such an obstacle is the annular groove 8 near the end of the large cylinder 5. Instead of, or in addition to said groove 8, annular ribs or projections may be provided on the small plunger 2.

When an article without an out turned brim B should be produced, the counterbore 7 may be omitted, but in this case it is desirable to provide on either or both plunger ends concentric ribs, grooves or the like in order to prevent an irregular flowing of the material.

When the formed cap is slid off the plunger 2, it undergoes usually a sensible elastic constriction which may be utilized for automatically encasing in said cap, when it is extruded, rigid fittings such as bushings, which may be threaded or otherwise provided with other attachment means. These members to be incorporated in the cap are arranged on the smaller plunger 2 and, after the extrusion, are slid off the same together with the cap, in which they come to be steadily encased.

It is to be remarked eventually that the axial sliding of the die 3 with respect to the plungers 1, 2 during the extrusion; instead of taking place automatically due to the pressure of the extruded resin, as above described, may be obtained or rendered easy by means of control means. Of course, a like effect may be obtained by causing the large plunger 1 to yield slightly under the extrusion pressure of the small plunger 2, or by equivalent means permitting an insertion in a desired measure of the small plunger into the larger bore.

From the foregoing it is apparent that the invention is not limited to the constructive form as just described and shown, but may be amply varied and modified.

Thus, for example, although in the specification the bores of the die and the corresponding plungers have been described as cylindrical, it is to be understood that the ends of the said bores and plungers may be also frusto-conical slightly elliptical or even polyhedrical, and therefore, in the following claims the term "cylindrical" when referred to the die bore and/or to the small plunger end, shall include also these forms.

Furthermore, although for simplicity of construction and description it has been assumed that the plungers are of different diameters, it is to be understood both said plungers may have substantially the same diameter, or even the "action" plunger may be larger than the "reaction" plunger, provided the cylinder in which the said "reaction" plunger is fitted be provided with a larger counter-bore at its inner end.

What we claim is:

1. A process for the manufacture of hollow articles of a synethetic resin of the class consisting of polyvinyl and polyethylene resins by cold extrusion starting from disc-shaped blanks, comprising inserting a disc between two oppositely lying co-axial plungers having different diameters and slidably mounted in a pair or corresponding cylinders firmly attached together and forming an annular step at their meeting plane; said cylinders being slidable together in the direction of the smaller diameter plunger; exercising a pressure, on the smaller diameter plunger, which is sufficient to squeeze said material and cause it to flow radially, while in a solid condition, and react in axial direction against said annular step, whereby said cylinders are shifted by the pressure of the squeezed material in the direction of said smaller diameter plunger by the squeezed material which thus fills an annular space formed as a consequence of said shifting between that part of the last named plunger which comes to lie inside said larger diameter cylinder and the corresponding wider bore end of said cylinder, the hollow, article thus produced being constituted by the synthetic resin filling said annular gap and the space between the two plunger ends.

2. A process according to claim 1, comprising lubricating of said annular chamber.

References Cited in the file of this patent

UNITED STATES PATENTS

| | | |
|---|---|---|
| 1,183,956 | Collins et al. | May 23, 1916 |
| 1,512,313 | Rowe | Oct. 21, 1924 |
| 2,037,269 | Reiser | Apr. 14, 1936 |
| 2,223,321 | Kempe | Nov. 26, 1940 |
| 2,307,846 | Miles | Jan. 12, 1943 |
| 2,658,238 | Rizzo | Nov. 10, 1953 |
| 2,701,894 | Hammerly | Feb. 15, 1955 |
| 2,746,087 | Dolezal | May 22, 1956 |
| 2,854,694 | Munford | Oct. 7, 1958 |